United States Patent [19] [11] 4,135,864
Lassota [45] Jan. 23, 1979

[54] ROTARY COMPRESSOR AND PROCESS OF COMPRESSING COMPRESSIBLE FLUIDS

[76] Inventor: Marek J. Lassota, 8657 W. Foster Ave., Apt. 1B, Chicago, Ill. 60656

[21] Appl. No.: 791,423

[22] Filed: Apr. 27, 1977

Related U.S. Application Data

[63] Continuation-in-part of Ser. No. 659,430, Feb. 19, 1976, abandoned, which is a continuation-in-part of Ser. No. 610,159, Sep. 4, 1975, Pat. No. 4,010,675, which is a continuation of Ser. No. 523,958, Nov. 14, 1975, abandoned.

[51] Int. Cl.[2] ........................ F01C 1/24; F01C 21/08; F01C 21/12; F16J 1/24

[52] U.S. Cl. ........................................ 418/1; 418/58; 418/83; 418/97; 418/142; 418/151; 92/177

[58] Field of Search .................. 418/1, 15, 54, 58-60, 418/83, 151, 160, 97, 142; 417/460, 462-466; 123/42, 51 B; 91/196; 92/177

[56] References Cited

U.S. PATENT DOCUMENTS

| | | | |
|---|---|---|---|
| 632,010 | 8/1899 | Gamble | 91/196 |
| 779,900 | 1/1905 | Bartlett | 418/160 |
| 1,622,816 | 3/1927 | Sperry | 418/58 |
| 1,718,070 | 6/1929 | Peters | 92/177 |
| 1,864,699 | 6/1932 | Varley | 418/54 |
| 3,090,366 | 5/1963 | Nagelmann | 123/42 |
| 3,315,653 | 4/1967 | Chicurel | 123/51 B |
| 3,835,823 | 9/1974 | Miller | 123/42 |

*Primary Examiner*—John J. Vrablik

[57] ABSTRACT

A rotary compressor and process of compressing compressible fluids wherein the compressor comprises a housing having two axially spaced walls and rotatable in relation to the housing piston and cylinder-piston journaled on eccentric portions of two oppositely rotatable shafts. The piston and cylinder-piston form moveable walls, and axially spaced walls of the housing form stationary walls of a compression chamber. Circulated fluid is drawn into the compression chamber through intake port or ports and is discharged through discharge valve or valves.

16 Claims, 13 Drawing Figures

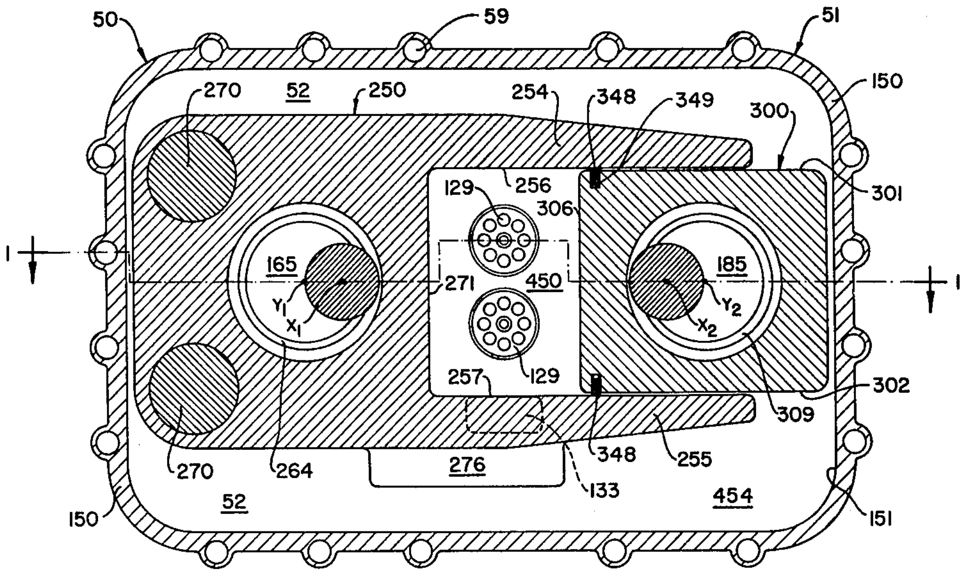
FIG. 2
FIG. 3
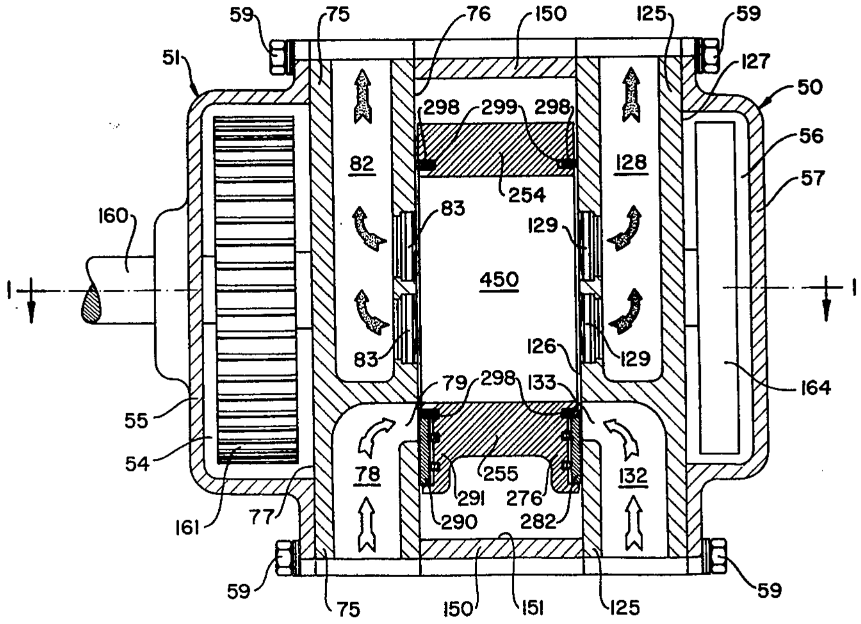

FIG. 8
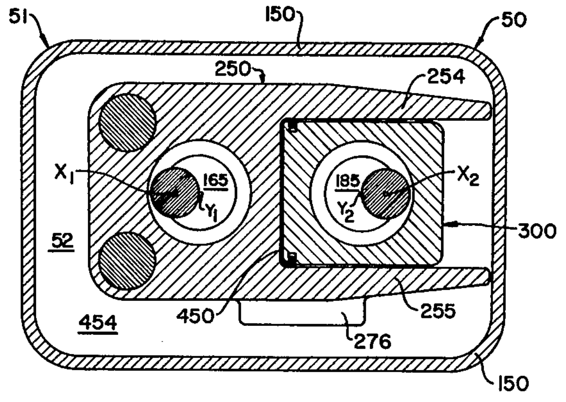
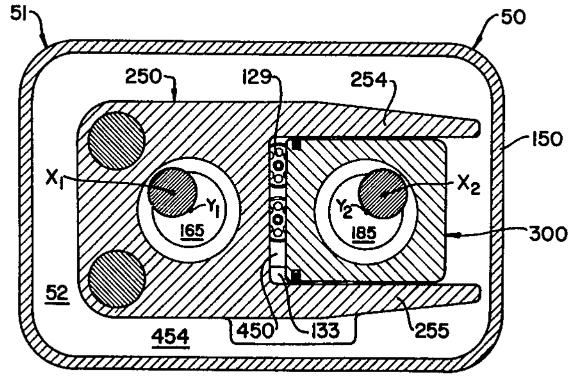
FIG. 9
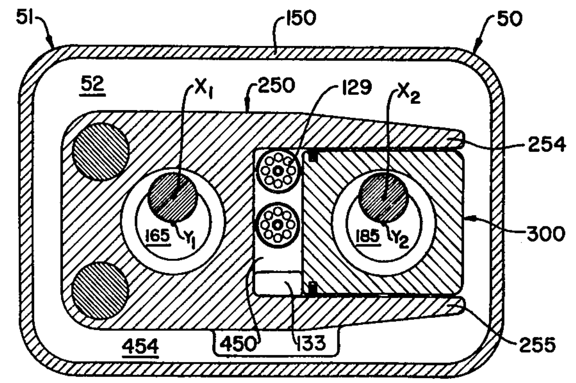
FIG. 10

ROTARY COMPRESSOR AND PROCESS OF COMPRESSING COMPRESSIBLE FLUIDS

CROSS REFERENCE TO RELATED APPLICATIONS

This application is a continuation-in-part of my pending prior application Ser. No. 659,430, filed on Feb. 19, 1976, now abandoned, which is a continuation-in-part of my earlier application Ser. No. 610,159, filed on Sept. 4, 1975, now U.S. Pat. No. 4,010,675, which is a continuation of prior application Ser. No. 523,958, filed Nov. 14, 1975, and now abandoned.

BACKGROUND OF THE INVENTION

This invention relates in general to a compressor and process of compressing, and more particularly to a rotary compressor and process of compressing compressible fluids.

Reciprocating piston compressors are well known in the art. They possess, however, inherent disadvantages of having reciprocating motion of a piston causing high stresses in certain components, vibration, noise, and limiting their rotational speeds. Due to speed limitations reciprocating compressors are relatively bulky and heavy machines. Further, they must be equipped with suction valves complicating design, lowering efficiency and causing other numerous disadvantages.

Various types of rotary compressors have been proposed to replace the reciprocating piston compressor in order to overcome some of its disadvantages, and to realize new advantages. However, such efforts have not been fully successful and the reciprocating piston compressor is in widespread use today.

SUMMARY OF THE INVENTION

The rotary compressor of this invention comprises generally an outer housing within which rotatable piston and cylinder-piston are received. The housing comprises two axially spaced walls, and the piston and cylinder-piston are operatively positioned between and adjacent to them. The piston and cylinder-piston are journaled on eccentric portions of two shafts, while the eccentric portions are disposed between the axially spaced walls of the housing. The shafts are journaled in axially spaced walls and are interconnected by a gearing means to transmit power from a drive shaft to a driven shaft and to coordinate their movements in such a way so the shafts rotate in coordinated rotations in opposite directions and with equal speeds. The piston and cylinder-piston follow coordinated planetary movements in opposite directions with and about the eccentric portions of their shafts and form moveable walls of a compression chamber, whereas the stationary walls of the compression chamber are formed by the axially spaced walls of the housing.

Intake charge of fluid circulated through the compressor of this invention is drawn into the compression chamber through suitable intake port or ports sequentially opened and closed during the operation of the compressor by cylinder-piston and piston elements. The compressed fluid is discharged from the compression chamber through suitable discharge valve or valves.

Internal leakage between the piston and cylinder-piston, and between the piston and cylinder-piston and adjacent to them spaced walls may be controlled through use of a sealing system comprising sealing elements received within grooves of the piston and cylinder-piston and sealingly engaged with co-working surfaces of the cylinder-piston and spaced walls, or may be controlled through hydrodynamic sealing between co-working elements without use of any sealing elements as a result of suitable running clearances between co-working elements, suitable surface finish and use of lubricant of suitable viscosity as a sealing medium. The same lubricant may be used to lubricate bearings and gear transmission.

OBJECTS OF THE INVENTION

One object of the present invention is to provide a rotary compressor simple in construction, compact and lightweight.

Another object of the present invention is to provide a rotary compressor capable of well balanced operation over wide range of RPM.

Yet another object of the present invention is to provide a rotary compressor having intake system with intake port or ports and discharge system with discharge valve or valves.

Still another object of the present invention is to provide a rotary compressor capable of long and trouble-free service life.

Another object of the present invention is to provide a new process of compressing compressible fluids by the rotary compressor of this invention.

These and other objects of the present invention will become apparent when reading the annexed detailed description in the view of the drawings.

BRIEF DESCRIPTION OF THE DRAWINGS

FIG. 2 is a transverse sectional view taken along line 2—2 of FIG. 1 and showing a piston and cylinder-piston journaled on eccentric portions of their shafts;

FIG. 3 is a vertical sectional view taken along line 3—3 of FIG. 1 and showing a compression chamber with intake and discharge systems;

FIGS. 8 through 13 are transverse sectional view taken along the line 2—2 of FIG. 1 and showing the rotary compressor of this invention undergoing the full cycle of operation.

DETAILED DESCRIPTION OF THE INVENTION

Figure 1:
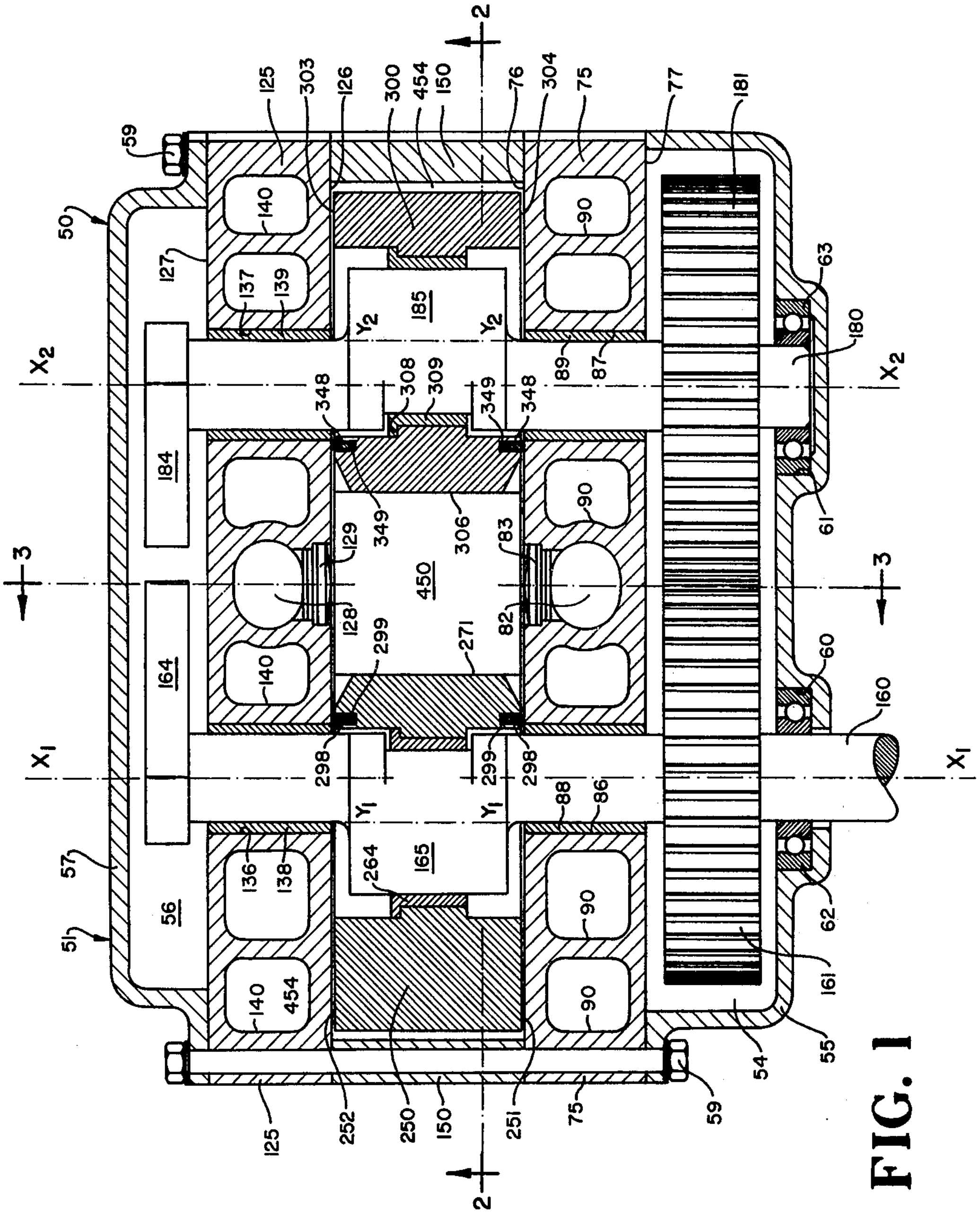
FIG. 1 is a longitudinal sectional view through a rotary compressor embodying this invention, taken along lines 1—1 in FIGS. 2 and 3.

Referring first to FIGS. 1, 2 and 3 of the drawings, a rotary compressor according to the invention is indicated by numeral 50. Compressor 50 comprises housing 51 within which piston 300 and cylinder-piston 250 forming moveable walls of compression chamber 450 are journaled on eccentric portions 165 and 185 of rotatable in opposite directions shafts 160 and 180.

Housing 51 comprises axially spaced walls 75 and 125 having surfaces 76 and 126 interconnected by peripheral wall 150 with inside surface 151 to form cavity 52.

Spaced walls 75 and 125 form stationary walls of compression chamber 450 and portions of surfaces 76 and 126 of spaced walls 75 and 125 define stationary surfaces of compression chamber 450, while other portions of surfaces 76 and 126 and surface 151 of peripheral wall 150 define stationary surfaces of chamber 454 located around cylinder-piston 250 and piston 300 and within cavity 52. Gear transmission cover 55 forms with surface 77 of spaced wall 75 gear cavity 54, and counterbalance cover 57 forms with surface 127 of spaced wall 125 counterbalance cavity 56. Elements 55, 75, 150, 125 and 57 are fastened by suitable fastening means, as for example bolts 59.

In the embodiment illustrated spaced walls 75 and 125 are spaced axially along axes $X_1$—$X_1$ and $X_2$—$X_2$ of shafts 160 and 180 by peripheral wall 150 positioned between and secured to spaced walls 75 and 125. However, any suitable spacing means, different from those described, can be used to axially space walls 75 and 125 as required for operation of cylinder-piston 250 and piston 300.

Internal structures of spaced walls 75 and 125 are best shown in FIGS. 1 and 3. Wall 75 has channel 78 communicating with compression chamber 450 through suitable intake port 79, and discharge channel 82 connected with compression chamber by suitable discharge valve or valves 83. Wall 125 has intake channel 132 communicating with compression chamber 450 through suitable intake port 133, and discharge channel 128 connected with compression chamber 450 by suitable discharge valve or valves 129. Intake port 133 and discharge valves 129 are also shown in view of FIG. 2.

In the embodiment illustrated, the intake and discharge systems are shown in both spaced walls 75 and 125. However, any suitable combination of the intake and discharge systems in one or both spaced walls can be used.

Intake port or ports can be of any shape and size as suitable for desired operating characteristics of the compressor.

Spaced walls 75 and 125 may have cooling chambers or passageways 90 and 140 to circulate suitable coolant. If air is used as a cooling medium, chambers or passageways 90 and 140 may have cooling ribs on their internal surfaces.

Figure 5:
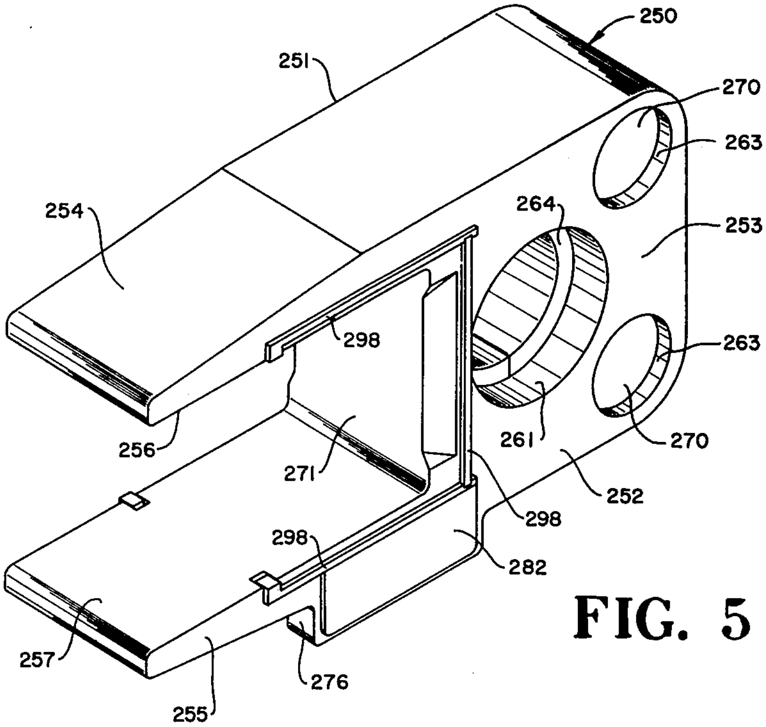
FIG. 5 is a perspective view of the cylinder-piston with its bearing and elements sealing the compression chamber and intake port assembled.

Cylinder-piston 250 with its elements sealing compression chamber 450 and intake port 133 and bearing 264 assembled is best shown in view of FIG. 5. The term "cylinder-piston" refers to an element operating as both a cylinder and a piston, although the configuration of this element is not at all geometrically cylindrical.

Cylinder-piston 250 comprises body 253 and spaced arms 254 and 255 having opposing parallel surfaces 256 and 257 and forming a U-shaped opening for a piston. Bearing 264 is located in passageway 261 of body 253. At the end of cylinder-piston body 253 remote from spaced arms 254 and 255 balancing elements 270 may be received in passageways 263. The purpose of balancing elements 270 is to balance the masses of spaced arms 254 and 255 to make a center of gravity of cylinder-piston 250 located on or close to axis $Y_1$—$Y_1$ common for bearing 264 and eccentric portion 165 of shaft 160. However, balancing of cylinder-piston 250 can be realized without use of balancing elements 270, and sufficiently large portion of body 253 remote from spaced arms 254 and 255 can act as a balancing element to balance cylinder-piston 250.

Body 253 at the end adjacent to spaced arms 254 and 255 has surface 271 connecting two side faces 251 and 252, and further connecting opposing parallel surfaces 256 and 257 of spaced arms 254 and 255. Surfaces 256, 257 and 271 form three of four moveable surfaces of compression chamber 450.

Figure 7:
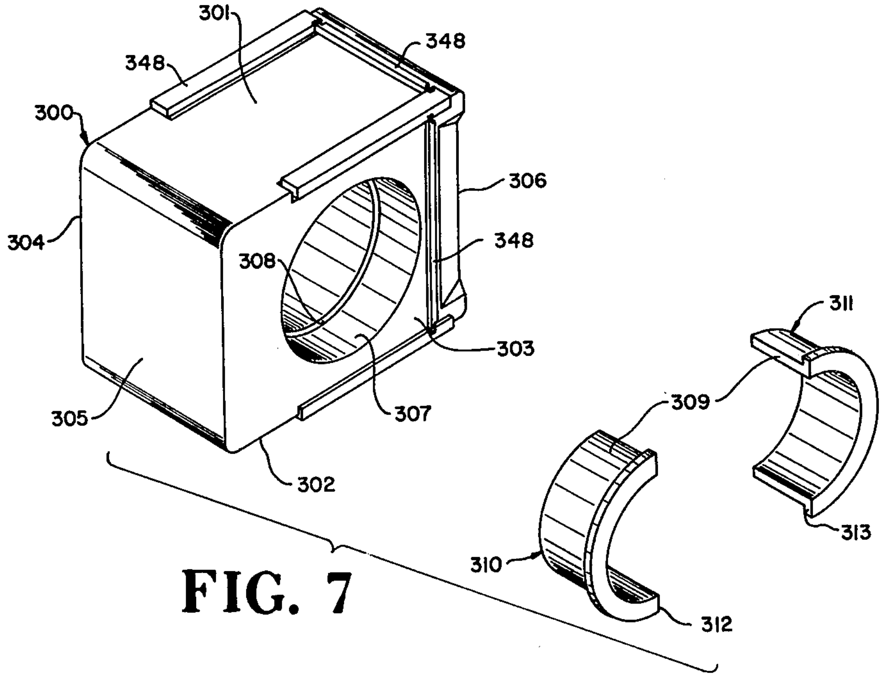
FIG. 7 is a perspective view of the piston with its bearing exploded and with elements sealing the compression chamber assembled.

FIG. 7 shows piston 300 with its sealing elements assembled and bearing 309 exploded. Piston 300 has spaced side faces 303 and 304 interconnected by passageway 307 in which bearing 309 is located. Piston 300 has also pair of spaced faces 301 and 302 and pair of end faces 305 and 306. End face 306 connects spaced side faces 303 and 304 and spaced faces 301 and 302 and form fourth moveable surface of compression chamber 450, changing the volume of compression chamber 450 during the operation of the compressor.

The width of piston 300, measured along axis $Y_2$—$Y_2$ of its bearing 309 is coextensive with the width of cylinder-piston 250, measured along axix $Y_1$—$Y_1$ of its bearing 264.

Due to its symmetrical shape piston 300 can be readily balanced to have its center of gravity located on or close to the axis $Y_2$—$Y_2$ which is common for bearing 309 and eccentric portion 185 of shaft 180.

Figure 4:
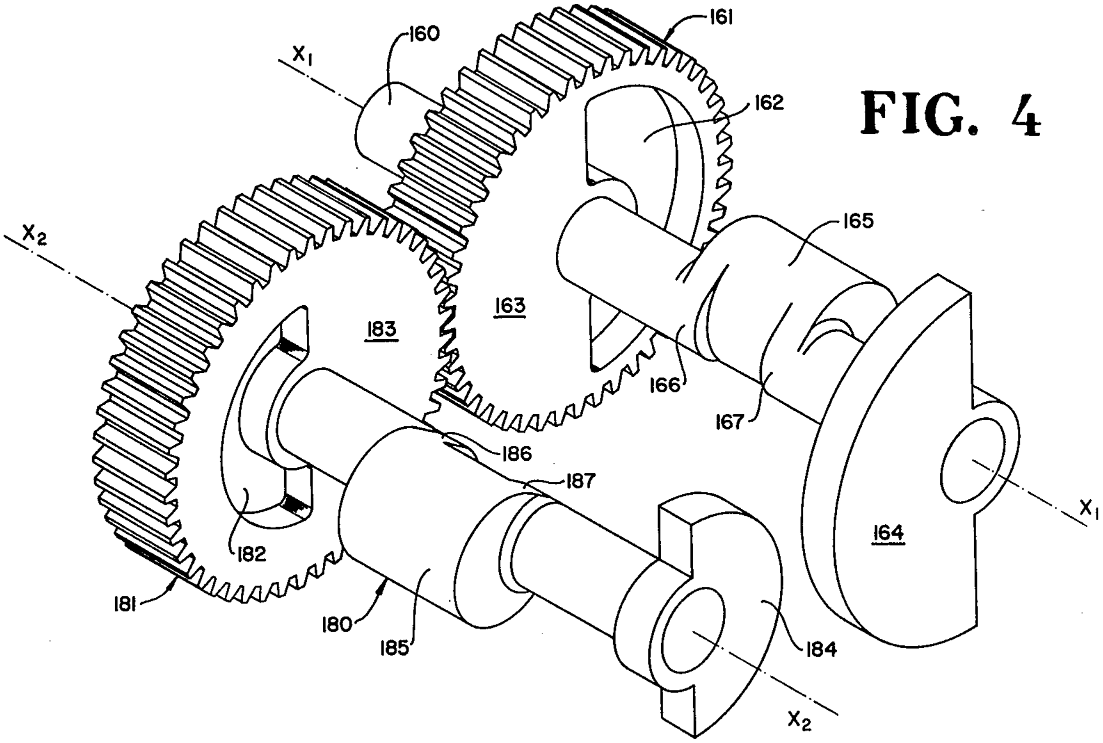
FIG. 4 is a perspective view of two shafts with gears and balancing elements.

FIG. 4 shows from the backside of the compressor shafts 160 and 180 assembled with their gears and balancing elements. Gears 161 and 181 and balancing elements 164 and 184 are secured to shafts 160 and 180 by means not shown. Gear 161 may have some material removed at 162; opposite portion 163 of gear 161 may be heavier and together with balancing element 164 may balance eccentric portion 165 and journaled thereon cylinder-piston 250. Similarly, gear 181 may have suitable amount of material removed at 182; opposite portion 183 of gear 181 may be heavier and may balance, with balancing element 184 eccentric portion 185 and piston 300 journaled thereon.

Different balancing systems then above described can be used to dynamically balance shafts 160 and 180 with recognized practice. For example, balancing system not utilizing gears but only balancing elements similar to balances 164 and 184 and suitably secured to shafts 160 and 180 can be used to balance one or both of shafts 160 and 180. Balanced shafts 160 and 180 have their centers of gravity located on or close to their axes of rotation $X_1$—$X_1$ and $X_2$—$X_2$, as required for balanced operation of a rotary compressor of this invention.

Eccentric portions 165 and 185 can be cranks when shafts 160 and 180 are crankshafts, or can be eccentrics when shafts 160 and 180 are eccentric shafts. Eccentric portions 165 and 185 have axes $Y_1$—$Y_1$ and $Y_2$—$Y_2$ eccentric from and parallel to axes $X_1$—$X_1$ and $X_2$—$X_2$ of shafts 160 and 180.

Assembled rotary compressor of the embodiment illustrated is best seen in FIGS. 1 through 3.

Cylinder-piston 250 is journaled on eccentric portion 165 of shaft 160; piston 300 is journaled on eccentric portion 185 of shaft 180 and is slidably positioned between spaced arms 254 and 255 of cylinder-piston 250, which form a U-shaped opening for piston 300.

Shafts 160 and 180 are journaled in suitable bearings 88, 89, 138 and 139 located in their housings 86, 87, 136 and 137 in spaced walls 75 and 125. Bearings 88 and 138 journal shaft 160 and bearings 89 and 139 journal shaft 180. Shafts 160 and 180 are spaced for meshing of gears 161 and 181 and are rotating around axes $X_1$—$X_1$ and $X_2$—$X_2$. This is best seen in view of FIG. 1.

Shafts 160 and 180 may be additionally journaled in bearings 62 and 63 located in their housings 60 and 61 in gear transmission cover 55.

However, any suitable journaling system for journaling of shafts 160 and 180 and different from the above described can be used. For example, shafts 160 and 180 can be journaled in bearings suitably located in gear transmission cover 55 and in counterbalance cover 57 without being journaled in spaced walls 75 and 125, or any other suitable combination of bearings in elements 55, 75, 125 and 57, or in elements similar to covers 55 and 57 and suitable for supporting required bearings can be used. Elements with bearings journaling shafts 160 and 180 should be aligned by suitable means, as for example suitable dowel pins.

Bearing 309 of piston 300 is best seen exploded in view of FIG. 7. For assembly around eccentric portion 185 and between arms 186 and 187 of shaft 180 (when shaft 180 is a crankshaft) and within passageway 307 of piston 300, bearing 309 is split in two halves 310 and 311 comprising flanges 312 and 313. Flanges 312 and 313 may operatively postion halves 310 and 311 against step 308 in passagway 307. Any other suitable means to position halves 310 and 311, different from described above, can be used instead of flanges 312 and 313. Halves 310 and 311 should be secured to piston 300 by suitable securing means, not shown. Bearing 264 of cylinder-piston 250 can be mounted in passageway 261 and around eccentric portion 165 of shaft 160 and between arms 166 and 167 in a similar manner.

When shafts 160 and 180 are eccentric shafts having eccentrics 165 and 185 then any suitable bearings, for example, one-piece bearings, can be used to journal cylinder-piston 250 and piston 300.

Separate shaft bearings 88, 89, 138 and 139 (and, if necessary, bearings 62 and 63) and cylinder-piston and piston bearings 264 and 309, as shown in the drawings, can be replaced by suitable bearings machined directly in spaced walls 75 and 125 and in cylinder-piston body 253 and piston 300 if elements 75, 125, 253 and 300 are made of material having suitable bearing properties. For example, one such material can be suitable grade of cast iron.

Shafts 160 and 180 are interconnected by gears 161 and 181 to transmit power from a drive shaft to a driven shaft and to coordinate their rotations and rotate in coordinated rotations in opposite directions with equal speeds. Cylinder-piston 250 and piston 300 follow coordinated planetary rotations in opposite directions with and about eccentric portions 165 and 185 of shafts 160 and 180. Spaced faces 301 and 302 of piston 300 are disposed adjacent to opposing parallel surfaces 256 and 257 of spaced arms 254 and 255. Side face 251 of cylinder-piston 250 and spaced side face 304 of piston 300 are adjacent to surface 76 of wall 75. Likewise, side face 252 of cylinder-piston 250 and spaced side face 303 of piston 300 are disposed adjacent to surface 126 of wall 125. Surfaces 256, 257 and 271 of cylinder-piston 250 and end face 306 of piston 300 form moveable surfaces of compression chamber 450. Movement of surface 306 of piston 300 with respect to surfaces 256, 257 and 271 of cylinder-piston 250 changes the volume of variable volume compression chamber 450.

For efficient operation of the rotary compressor embodying this invention its compression chamber should be sealed. One solution is to introduce suitable sealing elements between co-working surfaces defining compression chamber 450. Such sealing system can comprise cylinder-piston sealing elements 298 located with their springs 299 in suitable grooves in side faces 251 and 252 and along edges of surfaces 271, 256 and 257 of cylinder-piston 250, and forming a part of compression chamber 450 sealing system. This is best shown in view of FIG. 5; springs 299 are shown in FIGS. 1 and 3.

Another portion of compression chamber 450 sealing system is formed by sealing elements 348 located with their springs 349 in suitable grooves in piston 300 around edges of end face 306 and in corners between spaced side faces 303 and 304 and spaced faces 301 and 302. This is best seen in FIG. 7; springs 349 are shown in FIGS. 1 and 2.

When fully assembled, sealing elements 298 are forced from their grooves in side faces 251 and 252 of cylinder-piston 250 by springs 299 into sealing engagement with surfaces 76 and 126 of spaced walls 75 and 125, and piston 300 sealing elements 348 are forced by springs 299 from their grooves into sealing engagement with surfaces 256 and 257 of arms 254 and 255 of cylinder-piston 250 and with surfaces 76 and 126 of spaced walls 75 and 125 to form a closed sealing path around compression chamber 450.

Another solution to seal compression chamber 450 is to sealingly engage all moveable and stationary elements forming compression chamber 450 without any sealing elements. Such sealing engagement between spaced sides 301 and 302 disposed adjacent to opposing parallel surfaces 256 and 257 of walls 254 and 255 of cylinder-piston 250; between side face 251 of cylinder-piston 250 and spaced side face 304 of piston 300 adjacent to surface 76 of wall 75, and between side face 252 of cylinder-piston 250 and spaced side faces 303 of piston 300 adjacent to surface 126 of spaced wall 125 can result from a combination of suitable running clearances between these elements, suitable finish of their coacting surfaces, use of lubricant of suitable viscosity and suitable rotational speed of the compressor.

However, any suitable sealing system different from systems above described can be used to seal compression chamber 450 without departing from the spirit of this invention. Also, housing 51 can be made as a pressure tight vessel, and an interior of housing 51 can be pressurized to a certain pressure to minimize leakage from the compression chamber into cavity 52, regardless of the type of sealing system used to seal the compression chamber.

Figure 6:
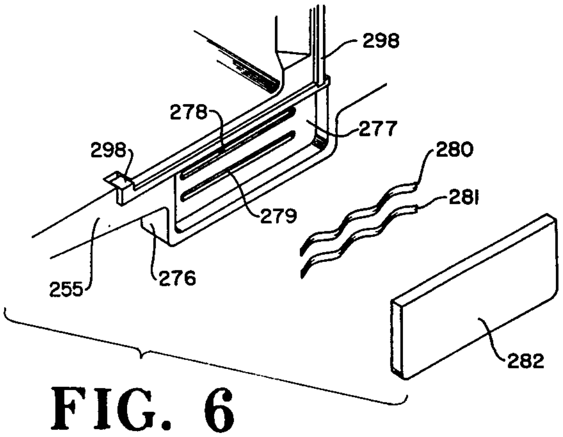
FIG. 6 is a perspective fragmentary view of the element sealing the intake port exploded.

Intake ports 79 and 133 can be sealed by suitable sealing plates 290 and 282 located in flanges 291 and 276 of arm 255 of cylinder-piston 250. Plate 282 can be forced by springs 280 and 281, located in grooves 278 and 279 of flange 276 from its seat 277 against surface 126 of wall 125 to seal port 133 periodically during the operation of the compressor. Plate 282 with its springs exploded is best seen in FIG. 6; assembled plate 282 is best seen in FIG. 5. Second plate 290 sealing intake port 79 and located in flange 291 of cylinder-piston 250 is best seen in FIG. 3. Intake ports 79 and 133 can be sealed also by suitable design of wall 255 with suitable running clearances between side faces 251 and 252 of wall 255 of cylinder-piston 250 and surfaces 76 and 126 of walls 75 and 125, use of lubricant of suitable viscosity and suitable rotational speed of the compressor.

However, the compressor of this invention can operate without sealing of intake ports 79 and 133. In certain applications intake channels 78 and 128 can be connected with cavity 52 in any desired way.

All coacting surfaces 251, 252, 256 and 257 of cylinder-piston 250, 301, 302, 303 and 304 of piston 300, and surfaces 76 and 126 of spaced walls 75 and 125 must be sufficiently wear-resistant as required for desired operating characteristics and life of the compressor. This can be realized by use of suitable materials for aforementioned elements, and suitable hardness, finish and lubrication of their coacting surfaces.

Bearings of the rotary compressor of this invention can be lubricated by any suitable lubricant which can be delivered to the bearings by suitable delivery lines located in stationary elements or in rotating shafts. The lubricant can be the same as lubricating gears 161 and 181 and coacting surfaces of cylinder-piston 250 and piston 300 with their seals and surfaces 76 and 126 of walls 75 and 125. Lubricant from suitable reservoir (not shown) can be distributed to lubricate bearings and other coacting surfaces by any suitable splash, gravity or pump-feed lubricating system. This compressor can also be built as an unlubricated or so-called oil-less machine by using suitable self-lubricating materials for bearings and other coacting surfaces.

Lubricant used to lubricate internal coacting surfaces can also be used as a cooling medium to cool internal components of the compressor.

The rotary compressor of this invention can be constructed of any suitable materials dependent upon the particular use desired, and can be powered by any suitable prime mover.

THE OPERATION OF THE INVENTION

During the operation of the rotary compressor of this invention cylinder-piston 250 and piston 300 follow coordinated planetary movements in opposite directions. Piston 300 moves between opposing parallel surfaces 256 and 257 of spaced arms 254 and 255 of cylinder-piston 250, and both bylinder-piston 250 and piston 300 operatively position and rotate each other. Movement of piston 300 in relation to cylinder-piston 250 results in changing volume of compression chamber 450. Intake ports 79 and 133 are opened by cylinder-piston 250 and piston 300 and closed by cylinder-piston 250, and discharge valves 83 and 129 are opened and closed as required for intake and discharge of circulated compressible fluid. Six representative positions of cylinder-piston 250 and piston 300 are shown in views of FIGS. 8 through 13. In these views visible are only intake and discharge systems of wall 125, but the description applies equally to intake and discharge systems of stationary wall 75.

Figure 11:
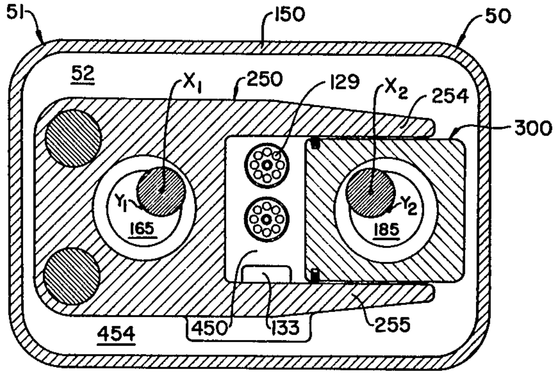
Figure 12:
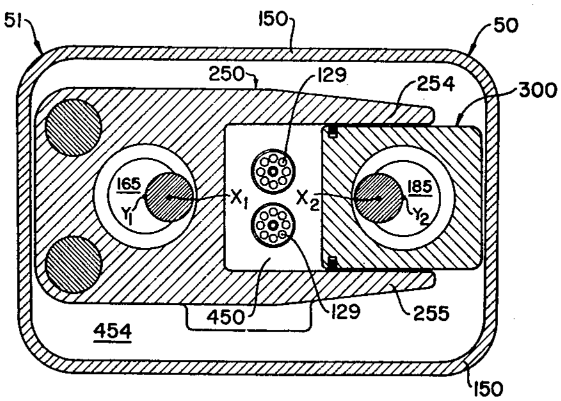
Figure 13:
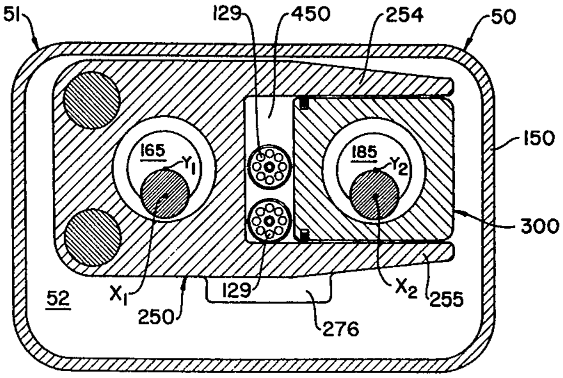

Intake of the charge of compressible fluid begins when compression chamber 450 is at about its minimum volume as represented by FIG. 8, and ends when compression chamber 450 is at about its maximum volume, as represented by FIG. 12. During the intake portion of the cycle, shafts 160 and 180 with cylinder-piston 250 and piston 300 execute half revolution with cylinder-piston 250 and piston 300 opening and cylinder-piston 250 closing intake ports 133 and 79. Opening of intake port 133 is best illustrated in FIGS. 8, 9 and 10, and closing of this port is best seen in FIGS. 11 and 12. Closing of intake port 133, as represented by FIG. 12 begins the compression portion of the cycle which lasts until pressure in compression chamber 450 reaches desired level and when discharge values 82 and 129 open. The desired pressure at which discharge values open can vary for various applications and operating conditions.

Discharge takes place through discharge valves 83 and 129 into discharge channels 82 and 128 of walls 75 and 125. During the compression and discharge portions of the cycle shafts 160 and 180 with cylinder-piston 250 and piston 300 complete full revolution, which ends when compression chamber 450 will be at about its minimum volume. The discharge ends also when compression chamber 450 is at about its minimum volume and new intake stroke follows after completion of the discharge.

It is understood that intake channels 78 and 132 of the compressor disclosed herein can be connected to an appropriate source of compressible fluid, and discharge channels 82 and 128 can be connected to an appropriate receiver of compressed fluid. The compressible fluid circulated through a rotary compressor of this invention can be any compressible fluid such as air, gas, mixture or vapor.

THE PROCESS OF COMPRESSING

A compressible fluid compressing process of my invention, as more explicitly set forth previously, comprises sequentially:

passing the compressible fluid to be compressed through intake port or ports into a variable volume compression chamber formed by a rotary moveable piston, a rotary moveable cylinder-piston having a U-shaped opening for the piston and axially spaced walls of a housing while the volume of the compression chamber increases as a result of the coordinated and in opposite directions planetary rotations of the piston and cylinder-piston with a distance between the piston and the body of cylinder-piston increasing, and while discharge valve or valves are closed;

closing the intake port or ports by one of spaced arms of the cylinder-piston when the compression chamber is at about its maximum volume;

compressing the compressible fluid in the compression chamber by decreasing the volume of the compression chamber as a result of the coordinated and in opposite directions planetary rotations of the piston and cylinder-piston while the distance between the piston and the body of the cylinder-piston decreases;

opening the discharge valve or valves when the pressure of the compressible fluid compressed in the compression chamber reaches desired level;

passing the compressed compressible fluid through the discharge valve or valves and into a discharge line while decreasing of the volume of the compression chamber continues;

closing the discharge valve or valves when the compression chamber is at about its minimum volume;

opening the intake port or ports by the cylinder-piston and the piston and as a result of the planetary rotation of the cylinder-piston when the compression chamber begins to increase its volume; and, repeating the cycle.

The compressible fluid flow pattern is best seen in FIG. 3 where clear arrows show incoming fresh charge, and dotted arrows show compressed fluid in the discharge system.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A compressible fluid compressing process comprising sequentially the steps of:

passing said compressible fluid to be compressed through an intake port into a variable volume compression chamber formed by a rotary moveable piston, a rotary moveable cylinder-piston having spaced arms forming a U-shaped opening for said piston and axially spaced walls of a housing while said volume of said compression chamber increases as a result of the coordinated and in opposite directions planetary rotations of said piston and said cylinder-piston with a distance between said piston and a body of said cylinder-piston increasing, and while a discharge valve is closed;

closing said intake port by one of said spaced arms of said cylinder-piston when said compression chamber is at about its maximum volume;

compressing said compressible fluid in said compression chamber by decreasing said volume of said compression chamber as a result of said coordinated and in opposite directions planetary rotations of said piston and said cylinder-piston while said distance between said piston and said body of said cylinder-piston decreases;

opening said discharge valve when the pressure of said compressible fluid compressed in said compression chamber reaches a desired level;

passing said compressible fluid through said discharge valve and into a discharge line while decreasing of said volume of said compression chamber continues;

closing said discharge valve when said compression chamber is at about its minimum volume;

opening said intake port by said cylinder-piston and by said piston and as a result of said planetary rotations of said cylinder-piston and said piston when said compression chamber begins to increase said volume; and repeating the cycle.

2. A rotary compressor comprising:

a cylinder-piston comprising a body and spaced arms extending from one end of said body, said spaced arms having opposing parallel surfaces and forming with said body of said cylinder-piston a U-shaped opening;

said cylinder-piston further having two side faces;

a piston positioned within said U-shaped opening of said cylinder-piston and having spaced faces adjoining said opposing parallel surfaces of said spaced arms of said cylinder-piston;

said piston further having two spaced side faces;

two axially spaced walls adjoining said side faces of said cylinder-piston and said spaced side faces of said piston;

a rotatable cylinder-piston shaft comprising an eccentric portion journaled in said body of said cylinder-piston;

a rotatable piston shaft comprising an eccentric portion journaled in said piston;

gearing means interconnecting said cylinder-piston shaft and said piston shaft so said shafts follow coordinated rotations in opposite directions and said cylinder-piston and said piston follow coordinated planetary rotations in opposite directions with and around said eccentric portions of said shafts;

said cylinder-piston and said piston forming moveable surfaces, and said axially spaced walls forming stationary surfaces of a compression chamber located between said body of said cylinder-piston and said piston and varying in volume upon said coordinated planetary rotations in opposite directions of said cylinder-piston and said piston;

intake means comprising an intake port leading to said compression chamber; and discharge means leading from said compression chamber.

3. The compressor of claim 2 wherein said cylinder-piston shaft and said piston shaft are journaled in bearings located in said axially spaced walls.

4. The compressor of claim 2 wherein said gearing means comprise gears interconnecting said cylinder-piston and said piston shafts and having equal number of teeth so said shafts rotate with equal rotational speeds in opposite directions.

5. The compressor of claim 2 which further comprises a balancing means, wherein said balancing means comprise cylinder-piston balancing means comprising a cylinder-piston balancing portion located in a part of said body of said cylinder-piston remote from said spaced walls, said balancing portion making the center of gravity of said cylinder-piston located on or close to the axis of said bearing located in said body of said cylinder-piston; and wherein said balancing means comprise piston balancing means, said piston balancing means being such design of said piston so said piston has its center of gravity located on or close to the axis of said bearing located in said piston; and wherein said balancing means further comprise cylinder-piston shaft and piston shaft balancing means, said last mentioned means comprising balancing elements secured to said shafts and dynamically balancing said shafts with all elements assembled and journaled on said shafts.

6. The compressor of claim 2 wherein said discharge means leading from said compression chamber comprise at least one discharge valve located in at least one of said axially spaced walls.

7. The compressor of claim 2 which further comprises lubricating means, said lubricating means comprising a lubricant reservoir containing suitable lubricant lubricating coacting surfaces of said cylinder-piston, said piston, said axially spaced walls, further lubricating said gears interconnecting said cylinder-piston shaft and said piston shaft, and said bearings of said cylinder-piston shaft and said piston shaft.

8. The compressor of claim 2 which further comprises a cooling means, said cooling means comprising a plurality of passageways located in said spaced housing walls in which suitable coolant is circulated.

9. The compressor of claim 2 wherein said eccentric portion of said cylinder-piston shaft is journaled in a bearing located in said body of said cylinder-piston, and wherein said eccentric portion of said piston shaft is journaled in a bearing located in said piston.

10. The compressor of claim 9 wherein said cylinder-piston shaft and said piston shaft are crankshafts and wherein said eccentric portions of said cylinder-piston shaft and said piston shaft are cranks.

11. The compressor of claim 9 wherein said cylinder-piston shaft and said piston shaft are eccentric shafts and wherein said eccentric portions of said cylinder-piston shaft and said piston shaft are eccentrics.

12. The compressor of claim 2 wherein said cylinder-piston, said piston and said axially spaced walls are sealingly engaged in forming said compression chamber.

13. The compressor of claim 12 wherein said sealing engagement between said cylinder-piston, said piston and said axially spaced walls results from use of sealing means comprising sealing elements located with springs in grooves in said cylinder-piston and in said piston and wherein said sealing elements located in said grooves of said cylinder-piston and said piston are sealingly engaged with co-working surfaces of said cylinder piston and said axially spaced walls in forming a sealing path around said compression chamber.

14. The compressor of claim 12 wherein said sealing engagement between said cylinder-piston, said piston and said axially spaced walls results from a combination of suitable running clearances between said cylinder-piston and said piston and between said cylinder-piston, said piston and said axially spaced walls, suitable finish of coacting surfaces of said cylinder-piston, coacting surfaces of said piston and coacting surfaces of said axially spaced walls, and use of lubricant of suitable viscosity to lubricate said coacting surfaces of said cylinder-piston, said piston and said axially spaced walls.

15. The compressor of claim 2 wherein said intake means leading to said compression chamber comprise at least one intake port located in one of said axially spaced walls, said intake port being sequentially opened and closed by said cylinder-piston and said piston to allow for required flow of incoming charge into said compression chamber.

16. The compressor of claim 15 wherein said intake port is opened by said cylinder-piston and said piston when said compression chamber is at about its minimum volume, and wherein said intake port is closed by said cylinder-piston when said compression chamber is at about its maximum volume.

* * * * *